US011235806B2

(12) United States Patent
Miller et al.

(10) Patent No.: US 11,235,806 B2
(45) Date of Patent: Feb. 1, 2022

(54) SPACE FRAME FRONT LOWER FRAME CONNECTION

(71) Applicant: Caterpillar Inc., Peoria, IL (US)

(72) Inventors: Tad W. Miller, Bonney Lake, WA (US); David O Zalanka, Mt Zion, IL (US); Timothy D Harman, Monticello, IL (US)

(73) Assignee: Caterpillar Inc., Peoria, IL (US)

( * ) Notice: Subject to any disclaimer, the term of this patent is extended or adjusted under 35 U.S.C. 154(b) by 284 days.

(21) Appl. No.: 16/664,104

(22) Filed: Oct. 25, 2019

(65) Prior Publication Data

US 2021/0122420 A1  Apr. 29, 2021

(51) Int. Cl.
*B62D 21/08* (2006.01)
*B62D 65/02* (2006.01)
*B62D 27/02* (2006.01)
*B62D 21/09* (2006.01)

(52) U.S. Cl.
CPC ............ *B62D 21/08* (2013.01); *B62D 21/09* (2013.01); *B62D 27/023* (2013.01); *B62D 65/02* (2013.01)

(58) Field of Classification Search
CPC .... B62D 23/005; B62D 25/04; B62D 29/008; B62D 21/02; B62D 27/023; B62D 21/152; B62D 25/082
USPC ... 296/205, 203.01, 29, 203.03, 70, 200, 30, 296/204, 187.03, 187.12, 210, 181.1, 296/203.02; 29/897.2, 421.1, 428, 464, 29/505
See application file for complete search history.

(56) References Cited

U.S. PATENT DOCUMENTS

| 4,355,844 | A | * | 10/1982 | Fantini Muzzarelli ...................... B62D 23/005 280/784 |
| 4,509,879 | A | | 4/1985 | Pearce |
| 4,624,090 | A | | 11/1986 | Stienen |
| 4,704,836 | A | | 11/1987 | Codd |
| 4,721,407 | A | * | 1/1988 | Liu .......................... B62K 19/22 403/205 |
| 7,322,106 | B2 | * | 1/2008 | Marando ............... B22D 19/045 29/507 |
| 7,341,285 | B2 | * | 3/2008 | McPherson ........... B29C 66/342 285/286.1 |

(Continued)

FOREIGN PATENT DOCUMENTS

| DE | 102010033289 | 5/2015 |
| WO | 2015175892 | 11/2015 |

*Primary Examiner* — D Glenn Dayoan
*Assistant Examiner* — Sunsurraye Westbrook
(74) *Attorney, Agent, or Firm* — Oblon, McClelland, Maier & Neustadt

(57) ABSTRACT

A front lower frame connection can comprise a center boss, outer and inner rearward horizontal front lower frame tube connection bosses, a rearward angular front lower frame tube connection boss, a vertical front lower frame tube connection boss, a forward angular front lower frame tube connection boss, outer and inner forward horizontal front lower frame tube connection bosses, a rearward horizontal beam, and a forward horizontal beam. The rearward horizontal beam can have an outer rearward horizontal beam member, and an inner rearward horizontal beam member. The forward horizontal beam can have an outer forward horizontal beam member, and an inner forward horizontal beam member.

20 Claims, 6 Drawing Sheets

(56) References Cited

U.S. PATENT DOCUMENTS

| | | | |
|---|---|---|---|
| 8,544,587 B2 * | 10/2013 | Holroyd | B60G 7/02 180/210 |
| 9,719,243 B2 | 8/2017 | Mason | |
| 9,731,773 B2 | 8/2017 | Gami et al. | |
| 9,884,663 B2 | 2/2018 | Czinger et al. | |
| 9,975,179 B2 | 5/2018 | Czinger et al. | |
| 10,183,706 B2 | 1/2019 | Miller et al. | |
| 2015/0107181 A1 | 4/2015 | Larsen et al. | |
| 2016/0039463 A1 | 2/2016 | Ormiston et al. | |
| 2016/0264189 A1 | 9/2016 | Gami et al. | |
| 2018/0208251 A1 | 7/2018 | Miller et al. | |

* cited by examiner

SPACE FRAME FRONT LOWER FRAME CONNECTION

TECHNICAL FIELD

The present disclosure relates to space frames, and more particularly to space frame front lower frame connections, and systems, components, and methods thereof.

BACKGROUND

Conventional haul trucks, such as off-highway rear haul trucks, may use welded steel frames that can be extremely heavy and may require many meters of welding to fabricate a completed frame. Space frames offer a lighter and stronger alternative to traditional welded steel frames, since far less steel is required. As a result, space frames offer considerable benefits in terms of cost, manufacturability, and performance. For example, haul trucks with space frames comparatively can haul larger payloads and consume less fuel.

Conventional space frame structures may use fabricated nodal connections. Such nodal connections may be used to create space frame structures associated with static applications. However, vehicular applications are, at least in part, dynamic in nature, and haul trucks can represent a particularly difficult application because of loads applied to the space frame as well as bending, twisting, and/or flexing that can occur as the haul truck travels on various types of terrain, such as off highway terrain. Carefully designed high-strength castings and fabrications can be required to provide appropriate stiffness and flexibility characteristics while insuring proper load transfer from the dump body to the wheels.

U.S. Pat. No. 10,183,706 ("the '706 patent") describes a node for interconnecting frame members of a frame. According to the '706 patent, a plurality of cup-shaped node connectors are disposed on the node body, where each of the node connectors includes a closed end attached to the node body and an open end opposite the closed end and extending away from the node body. The '706 patent also describes that a sidewall extends between and connects the closed end to the open end and a tenon is formed on the open end. According to the '706 patent, the tenon is shaped and sized to fit within a frame member, and a transition is formed between the sidewall and the tenon defining a peripheral, radially outward facing groove in cooperation with the frame member, where the groove is shaped and sized to receive a weld.

SUMMARY OF THE DISCLOSURE

In one aspect, a front lower frame connection casting for a space frame of a haul truck is disclosed. The front lower frame connection casting can comprise a solid center boss; an outer rearward horizontal front lower frame tube connection boss; an inner rearward horizontal front lower frame tube connection boss; a rearward angular front lower frame tube connection boss; a vertical front lower frame tube connection boss; a forward angular front lower frame tube connection boss; an outer forward horizontal front lower frame tube connection boss; an inner forward horizontal front lower frame tube connection boss; a rearward horizontal beam; and a forward horizontal beam. The rearward horizontal beam can have an outer rearward horizontal beam member connecting the outer rearward horizontal front lower frame tube connection boss to the solid center boss, and an inner rearward horizontal beam member connecting the inner rearward horizontal front lower frame tube connection boss to the solid center boss, wherein the outer rearward horizontal beam member and the inner rearward horizontal beam member are integrally joined at the solid center boss and are orientated at a first acute angle with respect to each other. The forward horizontal beam can have an outer forward horizontal beam member connecting the outer forward horizontal front lower frame tube connection boss to the solid center boss, and an inner forward horizontal beam member connecting the inner forward horizontal front lower frame tube connection boss to the solid center boss, wherein the outer forward horizontal beam member and the inner forward horizontal beam member are integrally joined at the solid center boss and are orientated at a second acute angle with respect to each other.

In another aspect, a space frame for an off-highway rear haul truck is disclosed. The space frame can be comprised of a first front lower frame connection casting; and a second front lower frame connection casting spaced from the first front lower frame connection casting in a width direction of the space frame. Each of the first and second front lower frame connection castings can include a center boss, an outer rearward horizontal front lower frame tube connection boss extending rearward from the center boss, an inner rearward horizontal front lower frame tube connection boss extending rearward from the center boss, a rearward angular front lower frame tube connection boss extending rearward and upward from the center boss, a vertical front lower frame tube connection boss extending upward from the center boss, a forward angular front lower frame tube connection boss extending forward and upward from the center boss, an outer forward horizontal front lower frame tube connection boss extending forward from the center boss, an inner forward horizontal front lower frame tube connection boss extending forward from the center boss, a rearward horizontal beam, and a forward horizontal beam. The rearward horizontal beam can have an outer rearward horizontal beam member between the rearward horizontal front lower frame tube connection boss and the center boss, and an inner rearward horizontal beam member between the inner rearward horizontal front lower frame tube connection boss and the center boss, wherein the outer rearward horizontal beam member and the inner rearward horizontal beam member are orientated at a first acute angle with respect to each other. The forward horizontal beam can have an outer forward horizontal beam member between the outer forward horizontal front lower frame tube connection boss and the center boss, and an inner forward horizontal beam member between the inner forward horizontal front lower frame tube connection boss and the center boss, wherein the outer forward horizontal beam member and the inner forward horizontal beam member are at a second acute angle with respect to each other.

And in yet another aspect, a method regarding a front lower frame connection is disclosed. The method can comprise providing a center boss of the front lower frame connection; providing an outer rearward horizontal front lower frame tube connection boss of the front lower frame connection; providing an inner rearward horizontal front lower frame tube connection boss of the front lower frame connection; providing a rearward angular front lower frame tube connection boss of the front lower frame connection; providing a vertical front lower frame tube connection boss of the front lower frame connection; providing a forward angular front lower frame tube connection boss of the front lower frame connection; providing an outer forward horizontal front lower frame tube connection boss of the front lower frame connection; providing an inner forward horizontal front lower frame tube connection boss of the front lower frame connection; providing a rearward horizontal beam of the front lower frame connection; and providing a forward horizontal beam of the front lower frame connection. The rearward horizontal beam can have an outer rearward horizontal beam member connecting the outer rearward horizontal front lower frame tube connection boss to the center boss, and an inner rearward horizontal beam member connecting the inner rearward horizontal front lower frame tube connection boss to the center boss, wherein the outer rearward horizontal beam member and the inner rearward horizontal beam member are integrally joined at the solid center boss and are orientated at a first acute angle with respect to each other. The forward horizontal beam can have an outer forward horizontal beam member connecting the outer forward horizontal front lower frame tube connection boss to the center boss, and an inner forward horizontal beam member connecting the inner forward horizontal front lower frame tube connection boss to the center boss, wherein the outer forward horizontal beam member and the inner forward horizontal beam member are integrally joined at the solid center boss and are orientated at a second acute angle with respect to each other.

Other features and aspects of this disclosure will be apparent from the following description and the accompanying drawings.

DETAILED DESCRIPTION

Figure 1:
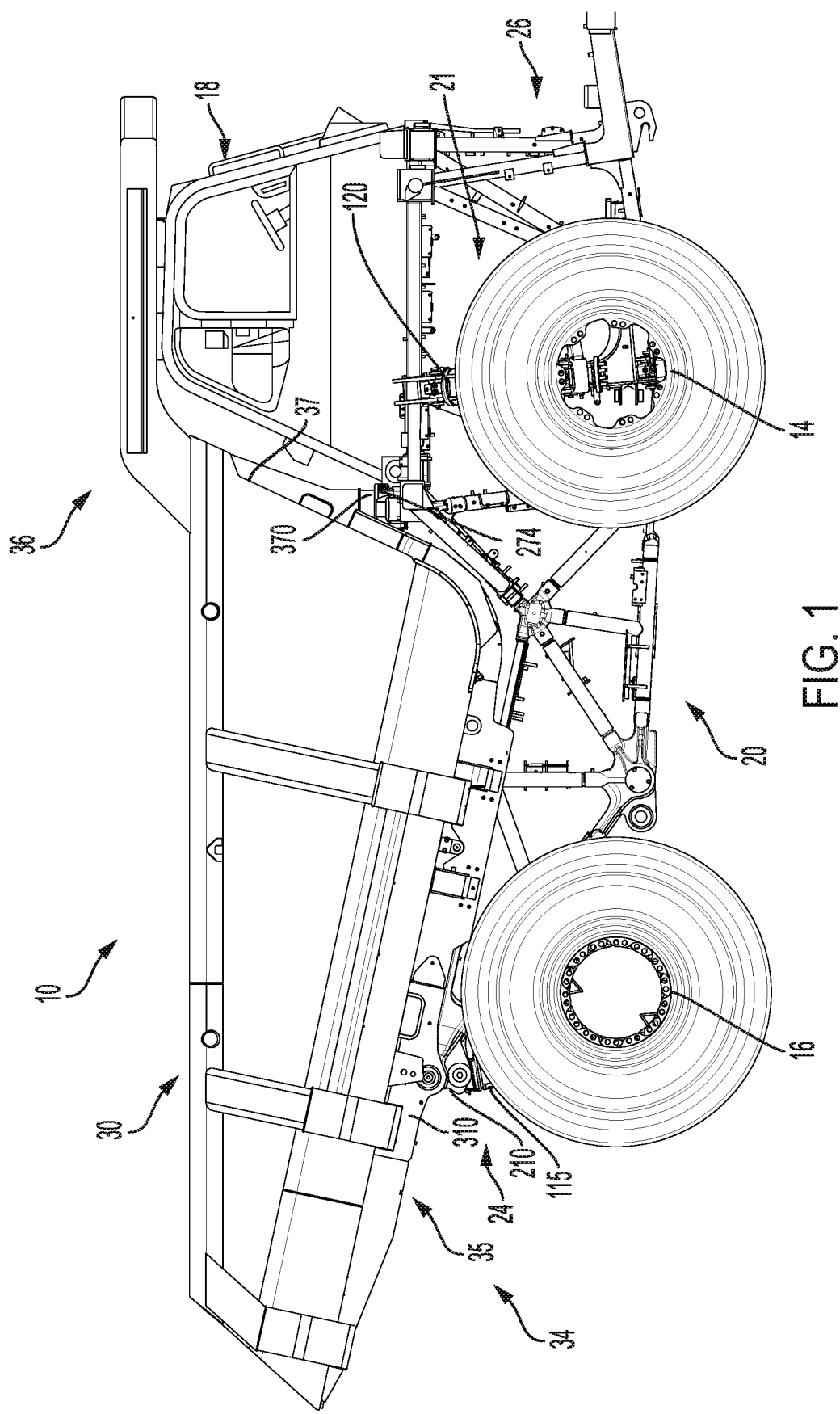
FIG. 1 is a side view of a machine according to embodiments of the disclosed subject matter.
Figure 2:
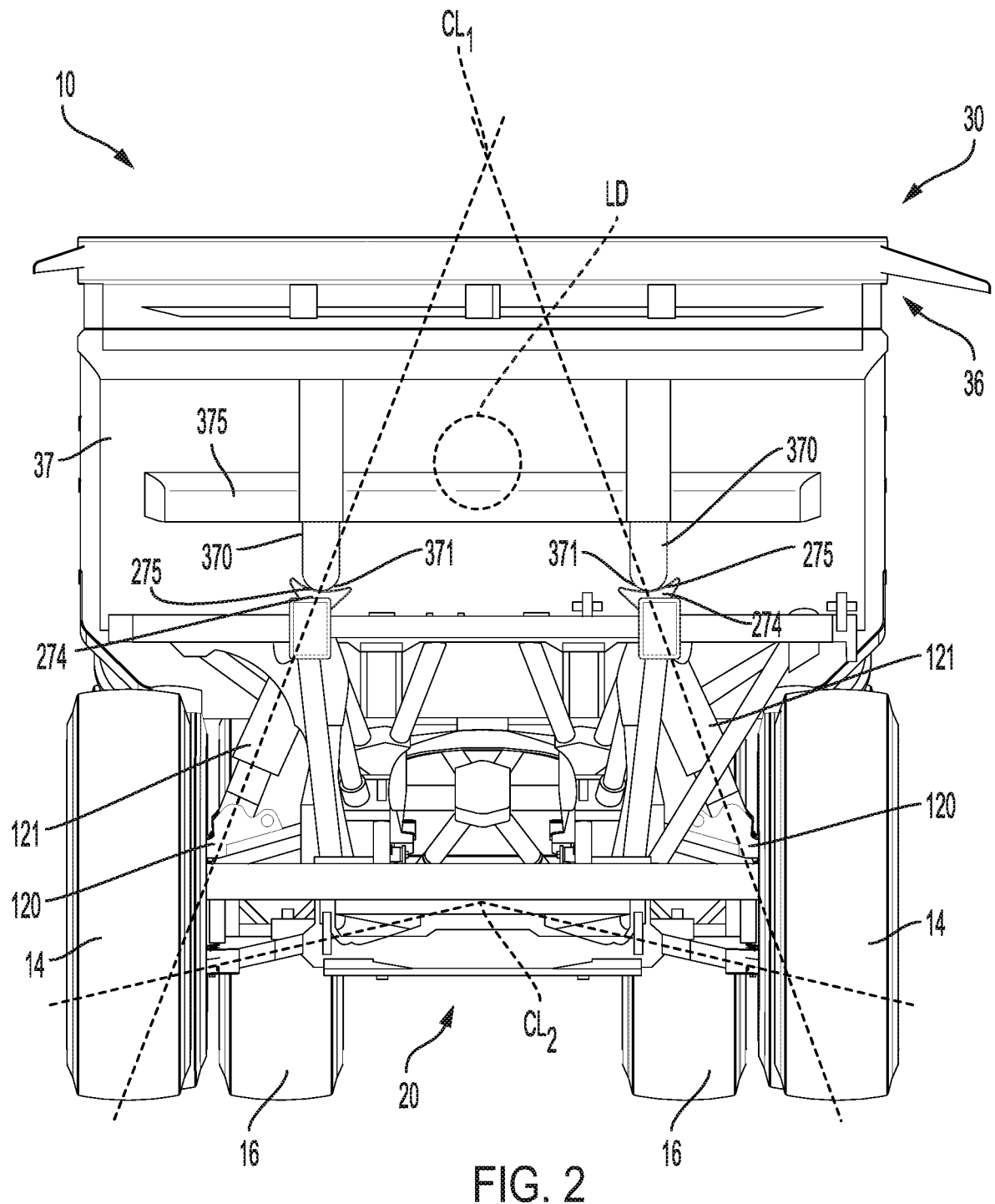
FIG. 2 is a front view of the machine of FIG. 1 with an operator cabin thereof removed to show a space frame and a dump body thereof according to embodiments of the disclosed subject matter.

Referring now to the drawings and with specific reference to FIG. 1 and FIG. 2, these figures illustrate an exemplary embodiment of a machine 10. Machine 10 may be a mobile machine that performs some type of operation associated with an industry such as mining, construction, or any other industry known in the art. For example, as shown in FIG. 1 and FIG. 2, machine 10 may be an earth moving machine, particularly, an off-highway rear haul truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20 at a front of the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 at a front 26 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversely. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Exhaust from the prime mover may be output from one or more exhaust outputs (not expressly shown). Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 3:
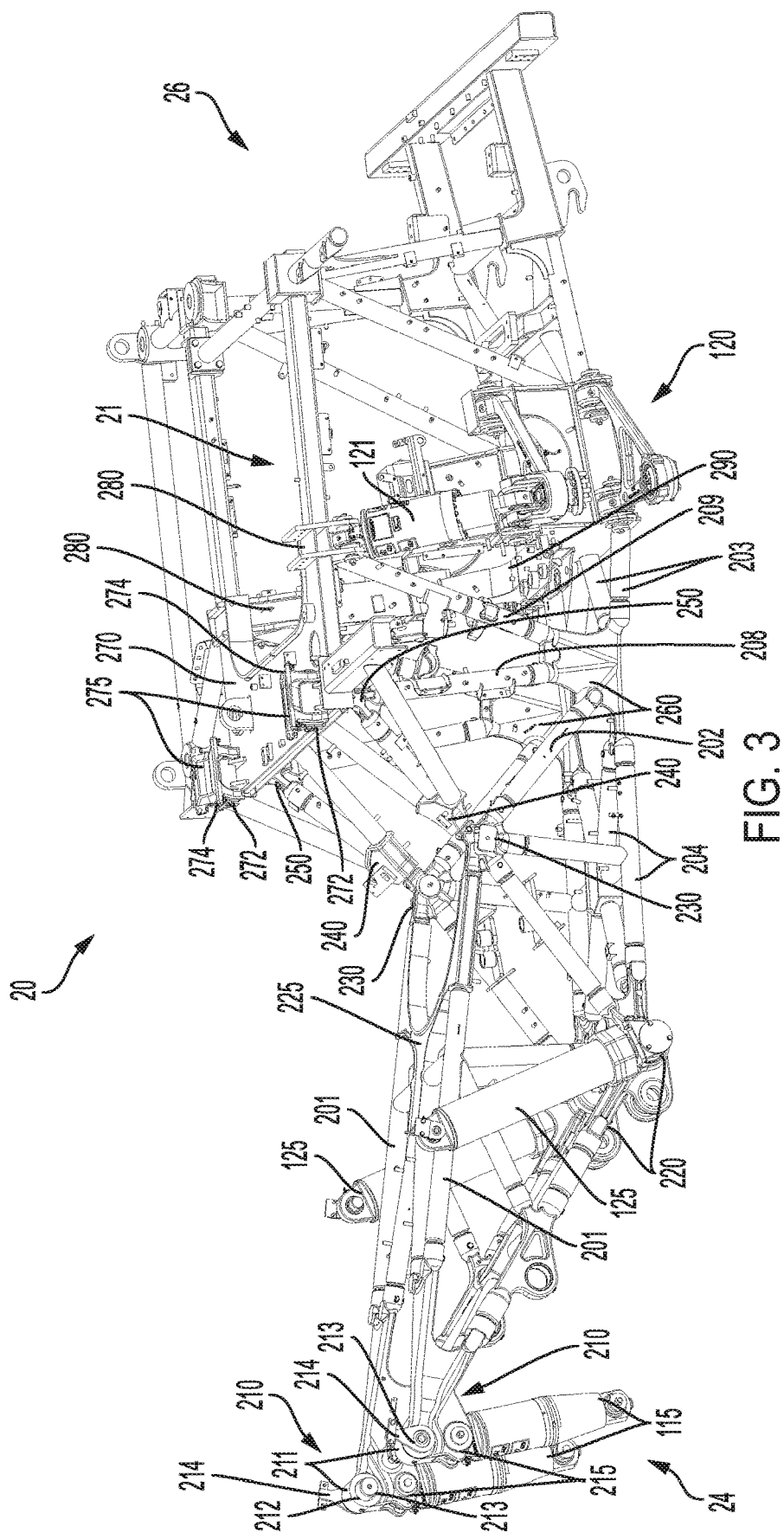
FIG. 3 is a side view of a space frame according to embodiments of the disclosed subject matter.

FIG. 3 is a more detailed view of the space frame 20. As shown, the space frame 20 can include a pair of rear frame connections 210 at the rear 24 of the space frame 20, a pair of center lower frame connections 220, a center upper horizontal frame connection 225, a pair of center upper frame connections 230, a pair of center upper frame nodal connections 240, a pair of front upper frame connections 250, a pair of front lower frame connections 260, a front upper frame connection 270, a pair of front upper suspension connections 280, and a front lower suspension connection 290. Though the foregoing connections are described as pairs, the connections of a pair may not be identical. For instance, the connections of a pair may be symmetrical, generally, but not necessarily identical. The foregoing connections can be castings or fabrications. In general, a casting may refer to a connection that is not welded to another support component of the space frame 20, and a fabrication may refer to a connection that is welded to another support component of the space frame 20.

The center lower frame connections 220 and corresponding connections can be as set forth in U.S. App. Ser. No. 16/663,892 filed Oct. 25, 2019 (Case 19-0767); the center upper horizontal frame connection 225 and corresponding connections can be as set forth in U.S. application Ser. No. 16/663,930 filed Oct. 25, 2019 (Case 19-0768); the center upper frame connections 230 and corresponding connections can be as set forth in U.S. application Ser. No. 16/664,042 filed Oct. 25, 2019 (Case 19-0773); the center upper frame nodal connections 240 and corresponding connections can be as set forth in U.S. application Ser. No. 16/663,955 filed Oct. 25, 2019 (Case 19-0771); the front upper frame connections 250 and corresponding connections can be as set forth in U.S. application Ser. No. 16/664,010 filed Oct. 25, 2019 (Case 19-0772); the front upper suspension connections 280 and corresponding connections can be as set forth in U.S. application Ser. No. 16/664,124 filed Oct. 25, 2019 (Case 19-0759); and/or the front lower suspension connection 290 and corresponding connections can be as set forth in U.S. application Ser. No. 16/664,169 filed Oct. 25, 2019 (Case 19-0760). The foregoing applications are incorporated herein by reference in their entireties.

The space frame 20 can also include a plurality of elongate support members, such as elongate support members 201, elongate support members 202, elongate support members 203, elongate support members 204, elongate support members 207, elongate support members 208, and elongate support members 209. Elongate support members, according to embodiments of the disclosed subject matter, can be in the form of rods and/or tubes, circular, for instance, where some or all of the rods and/or tubes may be solid or hollow.

Figure 4:
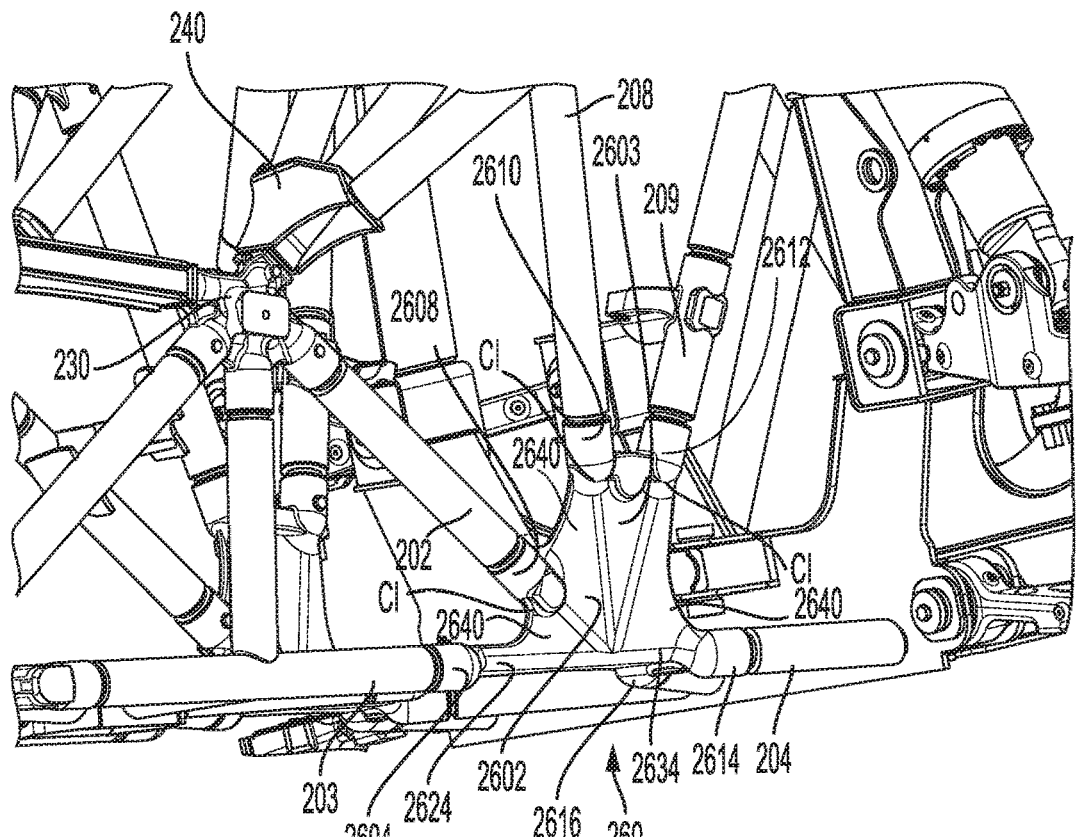
FIGS. 4-6 are views of a front lower frame connection according to embodiments of the disclosed subject matter.
Figure 5:
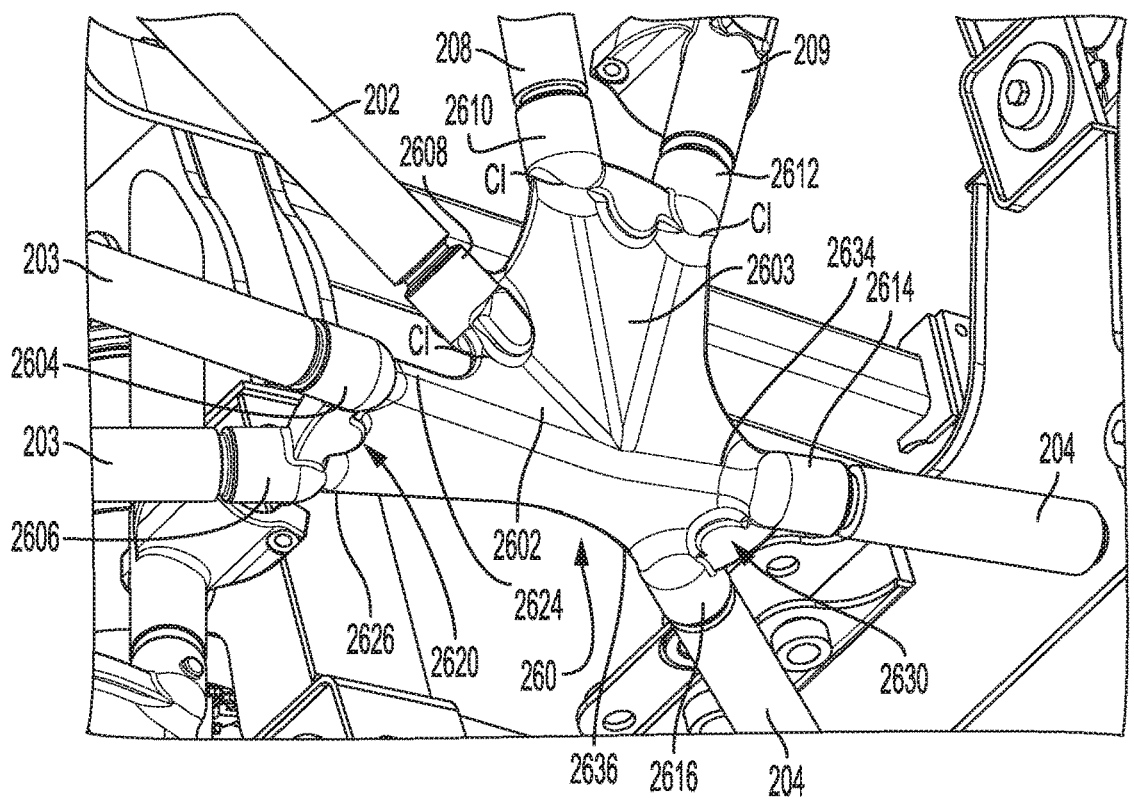
Figure 6:
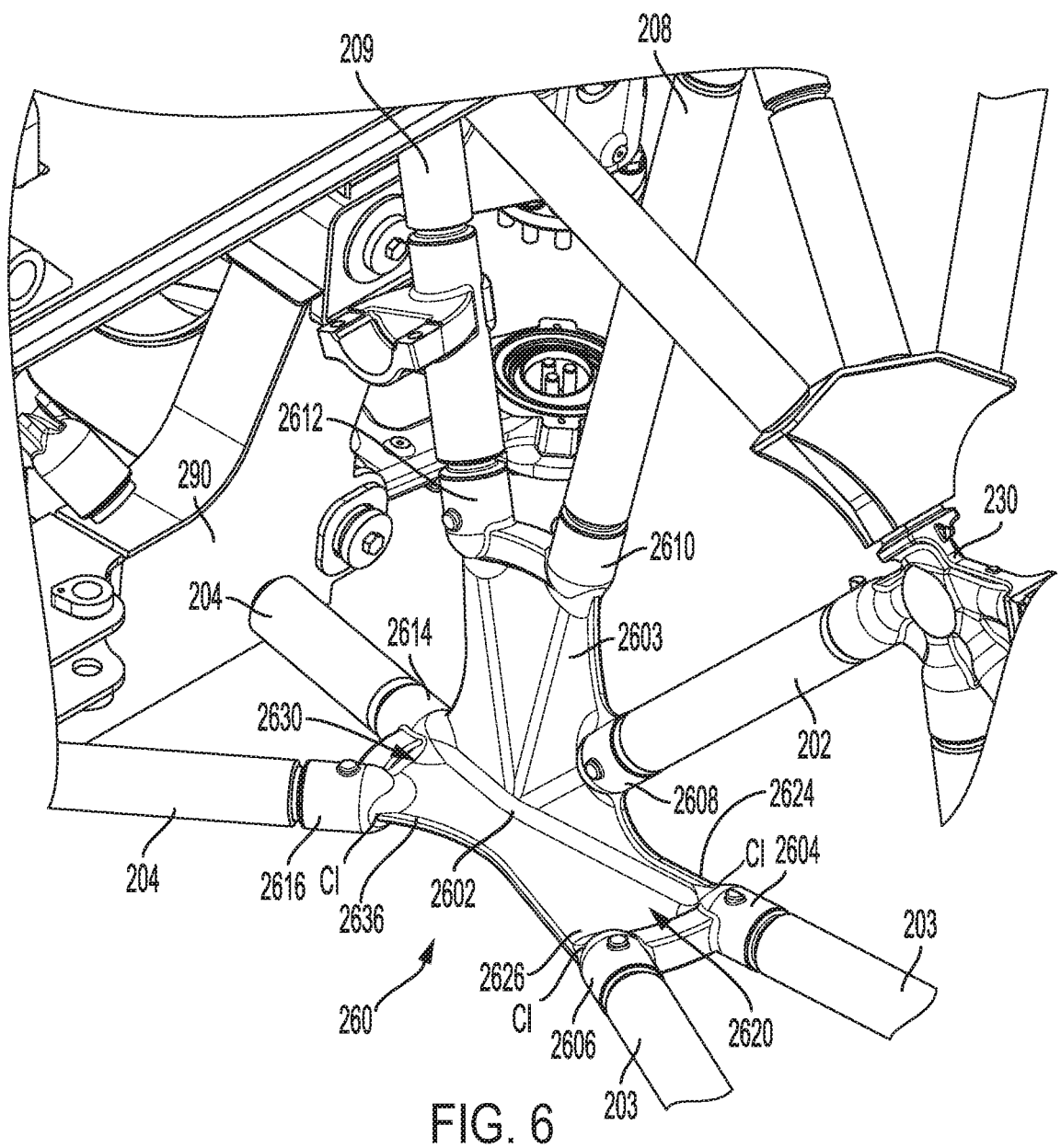

Turning to FIGS. 4-6, each front lower frame connection 260, which may be a casting, can include a center boss 2602. The center boss 2602 may be a solid body and, hence, may be characterized as a solid center boss. As shown, the center boss 2602 may have a base or bottom portion that is relatively more thick than a top portion 2603. According to one or more embodiments, the top portion 2603 may be or include a fin structure extending upward from the bottom portion. Optionally, the center boss 2602 may be flat on a bottom surface of the bottom portion.

The front lower frame connection 260 can also be comprised of an outer rearward horizontal front lower frame tube connection boss 2604; an inner rearward horizontal front lower frame tube connection boss 2606; a rearward angular front lower frame tube connection boss 2608; a vertical front lower frame tube connection boss 2610; a forward angular front lower frame tube connection boss 2612; an outer forward horizontal front lower frame tube connection boss 2614; and an inner forward horizontal front lower frame tube connection boss 2616. According to one or more embodiments, a rearward horizontal beam 2620 may be between the center boss 2602 and each of the outer rearward horizontal front lower frame tube connection boss 2604 and the inner rearward horizontal front lower frame tube connection boss 2606. Additionally or alternatively, a forward horizontal beam 2630 may be between the center boss 2602 and each of the outer forward horizontal front lower frame tube connection boss 2614 and the inner forward horizontal front lower frame tube connection boss 2616. As shown in FIG. 4, for instance, the vertical front lower frame tube connection boss 2610 and the forward angular front lower frame tube connection boss 2612 can be provided at a first height, the rearward angular front lower frame tube connection boss 2608 can be provided at a second height below the first height, and the outer and inner rearward horizontal front lower frame tube connection bosses 2604, 2606 and the outer and inner forward horizontal front lower frame tube connection bosses 2614, 2616 can be at a third height below the second height.

The outer rearward horizontal front lower frame tube connection boss 2604 and the inner rearward horizontal front lower frame tube connection boss 2606 each can extend rearward from the center boss 2602, the rearward angular front lower frame tube connection boss 2608 can extend rearward and upward from the center boss 2602, the vertical front lower frame tube connection boss 2610 can extend upward from the center boss 2602, the forward angular front lower frame tube connection boss 2612 can extend forward and upward from the center boss 2602, and the outer forward horizontal front lower frame tube connection boss 2614 and the inner forward horizontal front lower frame tube connection boss 2616 each can extend forward from the center boss 2602. The rearward horizontal beam 2620 may also extend rearward from the center boss 2602, and the forward horizontal beam 2630 may also extend forward from the center boss 2602.

For example, the rearward horizontal beam 2620 and/or the forward horizontal beam 2630 may extend horizontally or substantially horizontally (e.g., 1-2 degrees from horizontal). Likewise, the outer rearward horizontal front lower frame tube connection boss 2604, the inner rearward horizontal front lower frame tube connection boss 2606, the outer forward horizontal front lower frame tube connection boss 2614, and the inner forward horizontal front lower frame tube connection boss 2616 can extend horizontally or substantially horizontal (e.g., 1-2 degrees from horizontal). The rearward angular front lower frame tube connection boss 2608 can extend rearward at a positive acute angle relative to horizontal, the vertical front lower frame tube connection boss 2610 can extend vertically or substantially vertically (e.g., 5 degrees or less from vertical), and the forward angular front lower frame tube connection boss 2612 can extend forward at an acute angle relative to horizontal.

Optionally, in a side view of the front lower frame connection 260, acute angles may be formed between each of the rearward horizontal beam 2620 and the rearward angular front lower frame tube connection boss 2608, the rearward angular front lower frame tube connection boss 2608 and the vertical front lower frame tube connection boss 2610, the vertical front lower frame tube connection boss 2610 and the forward angular front lower frame tube connection boss 2612, and/or the forward angular front lower frame tube connection boss 2612 and the forward horizontal beam 2630. Some or all of the angles may be different. Optionally, respective longitudinal axes of the tube connection bosses may intersect at a predetermined point on the center boss 2602. Such predetermined point may be the center of mass of the center boss 2602.

Respective casting interfaces CI can be between the center boss 2602 and each of the rearward angular front lower frame tube connection boss 2608, the vertical front lower frame tube connection boss 2610, and the forward angular front lower frame tube connection boss 2612. Each of the foregoing tube connection bosses can taper from thick to thin toward respective casting interfaces CI with the center boss 2602. Additionally, according to one or more embodiments, a web 2640 may be provided between the rearward horizontal beam 2620 and the rearward angular front lower frame tube connection boss 2608, the rearward angular front lower frame tube connection boss 2608 and the vertical front lower frame tube connection boss 2610, and/or the forward angular front lower frame tube connection boss 2612 and the forward horizontal beam 2630.

Each of the tube connection bosses can be adapted to be fixedly attached (e.g., welded) to respective elongate support member of the space frame 20. For example, as shown in FIGS. 4-6, the outer and inner rearward horizontal front lower frame tube connection bosses 2604, 2606 can be fixedly attached to elongate support members 203; the rearward angular front lower frame tube connection boss 2608 can be fixedly attached to elongate support member 202; the vertical front lower frame tube connection boss 2610 can be fixedly attached to elongate support member 208; the forward angular front lower frame tube connection boss 2612 can be fixedly attached to elongate support member 209; and the outer and inner forward horizontal front lower frame tube connection bosses 2614, 2616 can be fixedly attached to elongate support members 204.

The rearward horizontal beam 2620 may have an outer rearward horizontal beam member 2624 and an inner rearward horizontal beam member 2626. The outer rearward horizontal beam member 2624 may be between the outer rearward horizontal front lower frame tube connection boss 2604 and the center boss 2602. The inner rearward horizontal beam member 2626 may be between the inner rearward horizontal front lower frame tube connection boss 2606 and the center boss 2602. According to one or more embodiments, the outer rearward horizontal beam member 2624 can connect the outer rearward horizontal front lower frame tube connection boss 2604 to the center boss 2602 and/or the inner rearward horizontal beam member 2626 can connect the inner rearward horizontal front lower frame tube connection boss 2606 to the center boss 2602. Optionally, the outer rearward horizontal beam member 2624 and the inner rearward horizontal beam member 2626 can be integrally joined (i.e., formed in once piece) at the center boss 2602.

Respective casting interfaces CI can be between the outer rearward horizontal beam member 2624 and the outer rearward horizontal front lower frame tube connection boss 2604 and the inner rearward horizontal beam member 2626 and the inner rearward horizontal front lower frame tube connection boss 2606. Each of the foregoing tube connection bosses can taper from thick to thin toward the respective casting interfaces CI.

As shown in FIG. 6, for instance, the outer rearward horizontal beam member 2624 and the inner rearward horizontal beam member 2626 can be oriented at an acute angle relative to each other. Thus, the outer rearward horizontal front lower frame tube connection boss 2604 and the inner rearward horizontal front lower frame tube connection boss 2606 can also be oriented with respect to each other at the acute angle.

The forward horizontal beam 2630 may have an outer forward horizontal beam member 2634 and an inner forward horizontal beam member 2636. The outer forward horizontal beam member 2634 may be between the outer forward horizontal front lower frame tube connection boss 2614 and the center boss 2602. The inner forward horizontal beam member 2636 may be between the inner forward horizontal front lower frame tube connection boss 2616 and the center boss 2602. According to one or more embodiments, the outer forward horizontal beam member 2634 can connect the outer forward horizontal front lower frame tube connection boss 2614 to the center boss 2602 and/or the inner forward horizontal beam member 2636 can connect the inner forward horizontal front lower frame tube connection boss 2616 to the center boss 2602. Optionally, the outer forward horizontal beam member 2634 and the inner forward horizontal beam member 2636 can be integrally joined (i.e., formed in once piece) at the center boss 2602.

Respective casting interfaces CI can be between the outer forward horizontal beam member 2634 and the outer forward horizontal front lower frame tube connection boss 2614 and the inner forward horizontal beam member 2636 and the inner forward horizontal front lower frame tube connection boss 2616. Each of the foregoing tube connection bosses can taper from thick to thin toward the respective casting interfaces CI.

As shown in FIG. 6, for instance, the outer forward horizontal beam member 2634 and the inner forward horizontal beam member 2636 can be oriented at an acute angle relative to each other. Thus, the outer forward horizontal front lower frame tube connection boss 2614 and the inner forward horizontal front lower frame tube connection boss 2616 can also be oriented with respect to each other at the acute angle. The acute angle can be the same as the acute angle between the outer rearward horizontal beam member 2624 and the inner rearward horizontal beam member 2626.

Turning back to FIG. 3, each elongate support member 201 can be provided between the rear frame connections 210 and the front upper frame connection 270 in a top plan view of the space frame 20. More specifically, each elongate support member 201 can be provided between the center upper horizontal frame connection 225 and one of the rear frame connections 210. Further, each elongate support member 201 can extend lengthwise generally horizontally, in this case rearward from the center upper horizontal frame connection 225 at a positive acute angle relative to a horizontal plane running through the front wheels 14 and the rear wheels 16. In that the elongate support members 201 are provided at an outer portion of the space frame 20 in a width direction of the space frame 20, the elongate support members 201 may be considered outer elongate support members 201. As an example, the outer elongate support members 201 may be outer frame tubes.

Each rear frame connection 210, which may be a casting, can have a rear support 211 and a rear suspension node 215. Discussed in more detail below, the rear support 211 can directly support the dump body 30, and the rear suspension node 215 can be coupled to a rear suspension member 115 of the rear suspension system. The rear frame connections 210 can also be coupled to a plurality of elongate support members, including elongate support members 201. According to one or more embodiments of the disclosed subject matter, each of the rear frame connections 210 can be seven-point connections. For instance, according to embodiments of the disclosed subject matter, the rear frame connections 210 and corresponding connections can be as set forth in U.S. application Ser. No. 16/663,815 filed Oct. 25, 2019 (Case 19-0764), which is incorporated herein by reference in its entirety.

The rear support 211 can be configured as a pivot pin boss with a pivot pin bore or opening 212. According to one or more embodiments, an outer surface of the rear support 211 (i.e., pivot pin boss) and the pivot pin bore 212 can be cylindrical. An axis of the pivot pin bore 212 can extend in a width direction of the space frame 20. Moreover, the axes of the pivot pin bores 212 from the rear supports 211 of the pair of rear frame connections 210 may be aligned with each other. That is, the axes of the pivot pin bores 212 can be coaxial or common. The pivot pin bore 212 can be configured to receive a pivot pin of a pivot pin interface 213 such that the pivot pin interface 213 is pivotally coupled to the rear support 211 via the pivot pin bore 212 and the pivot pin interface 213 can pivot or rotate about the axes of the pivot pin bore 212 and the pivot pin of the pivot pin interface 213. Discussed in more detail below, the pivot pin interface 213 can also be coupled to a bottom 35 of the dump body 30.

As shown in FIG. 3, the front upper frame connection 270 can be fixedly coupled to the front upper suspension connections 280, and a bottom of the front upper frame connection 270 can be fixedly coupled to the front upper frame connections 250. Additionally, the front upper frame connection 270, which may be a fabrication, can have a body with a pair of rocker attachment interfaces 272 on a top surface thereof. According to one or more embodiments, the front upper frame connection 270 and corresponding connections can be as set forth in U.S. application Ser. No. 16/663,849 filed Oct. 25, 2019 (Case 19-0766), which is incorporated herein by reference in its entirety.

The rocker attachment interfaces 272 can be spaced from each other in a width direction of the space frame 20, for instance, provided at opposite outer lateral edges of the body of the front upper frame connection 270, such as shown in FIG. 3. Each rocker attachment interface 272 can have a pivot pin bore configured to receive a pivot pin. Optionally, the pivot pin can be considered part of the rocker attachment interface 272. An axis of rotation for the pivot pin bore and the pivot pin can run horizontally or substantially horizontally in a length direction of the space frame 20. Moreover, the axes of rotation for the rocker attachment interfaces 272 can be parallel to each other.

Each rocker attachment interface 272 can have rotatably attached thereto a support rocker 274 via the pivot pin. In that the rocker attachment interfaces 272 can be spaced apart from each other in the width direction of the space frame 20, so too can be the support rockers 274. Moreover, the support rockers 274 can rotate or pivot laterally or in a width direction of the space frame 20 about the respective axes of rotation defined by the rocker attachment interfaces 272.

According to embodiments of the disclosed subject matter, each support rocker 274 can have an upward-facing contact surface 275. The upward-facing contact surface 275 can be concave, for instance, semi-cylindrical, elliptical, or multi-planar. Additionally, the upward-facing contact surface 275 can be or include a padding. According to embodiments of the disclosed subject matter, the support rocker 274 and/or components thereof, can be according to U.S. application Ser. No. 16/663,512 filed Oct. 25, 2019 (Case 18-1266) and/or U.S. application Ser. No. 16/663,551 filed Oct. 25, 2019 (Case 19-0783), each of which is incorporated herein by reference in its entirety. Discussed in more detail below, the support rockers 274, particularly the upward-facing contact surfaces 275 thereof, can receive a portion of corresponding vertical support structures 370 of the dump body 30 (see FIG. 7).

Figure 7:
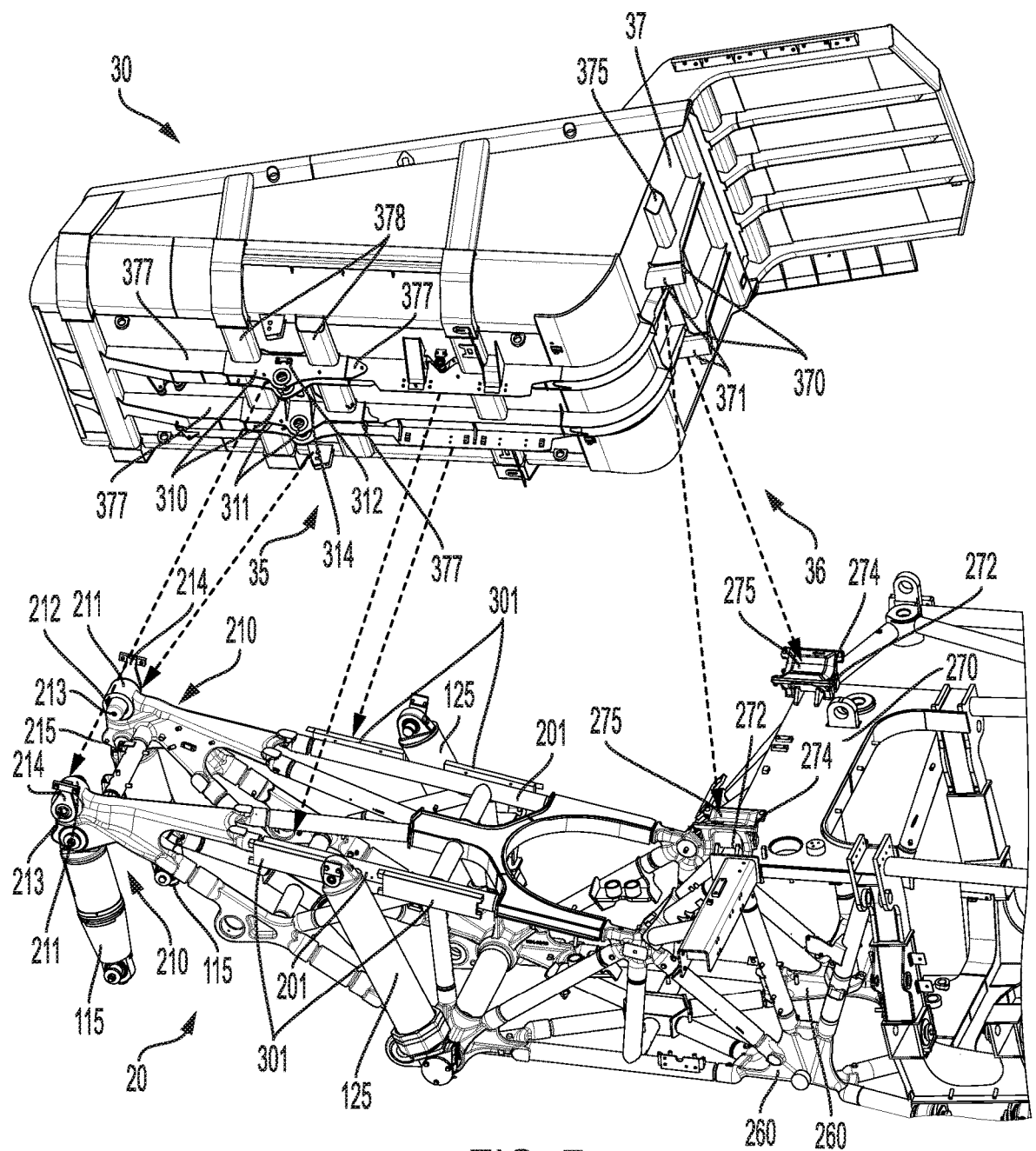
FIG. 7 is an exploded view of the space frame and dump body to show defined contact points according to embodiments of the disclosed subject matter.

Turning now to FIG. 7, the dump body 30 can have, on the bottom 35 thereof, a rear pivot support 310 and a pair of flat contact surfaces 301, and on the front wall 37 thereof, a pair of vertical support structures 370.

The rear pivot support 310 can be provided at the rear portion 34 of the dump body 30, such as shown in FIG. 7. The rear pivot support 310 can have a pair of rear pivots 311. The rear pivots 311 can be spaced apart from each other in a width or lateral direction of the dump body 30, such as shown in FIG. 7. The rear pivot support 310 can also include a cross-member 314, which can be provided between the rear pivots 311, fixedly connected to or part of the rear pivots 311 (i.e., integral and/or one-piece with).

The rear pivot support 310 can be fixedly coupled to the bottom 35 of the dump body 30. For example, the rear pivot support 310 can be welded to the bottom 35 of the dump body 30. More specifically, according to one or more embodiments of the disclosed subject matter, each rear pivot 311 can be welded to a corresponding longitudinal body support member 377 on the bottom of the dump body 30. As shown in FIG. 7, for instance, each rear pivot 311 can be welded in-line with the corresponding longitudinal body support member 377. Thus, the rear pivot 311 can be considered as part of the longitudinal body support member 377 (i.e., integral and/or one-piece with).

Each rear pivot 311 can also include a plurality of cut-outs, for instance, two cut-outs, spaced apart from each other in a length direction of the dump body 30. Each cut-out can receive or accept a transverse body support member 378. Moreover, the cut-outs of one of the rear pivots 311 can receive different transverse body support members 378, for instance, adjacent transverse body support members 378, such as shown in FIG. 7. Additionally, as shown, each transverse body support member 378 can extend through one cut-out of one rear pivot 311 and through an opposing cut-out of the other rear pivot 311.

According to one or more embodiments of the disclosed subject matter, the rear pivots 311 can also include an attachment interface 312 on an outer side surface thereof, such as shown in FIG. 7. As a non-limiting example, the attachment interface 312 can include a pair of projections configured to mate with corresponding notches of the pivot pin interface 213. The rear pivot support 310 and corresponding connections can be as set forth in U.S. application Ser. No. 16/663,627 filed Oct. 25, 2019 (Case 19-0763), which is incorporated herein by reference in its entirety.

The rear pivots 311 can be pivotally coupled to the rear supports 211 of the space frame 20 via the pivot pin interface 213. More specifically, for each rear pivot 311/rear support 211 pair, the rear support 211 can be provided in a pivot bore of the rear pivot 311 (e.g., between the two pivot bore portions of a single rear pivot 311) such that the pivot bore 212 of the rear support 211 is aligned with the pivot bore and such that a pin of the pivot pin interface 213 extends through the pivot bore 212 of the rear support 211 and the pivot bore of the rear pivot 311. An arm 214 of the pivot pin interface 213 can have one or more notches configured to be mated with corresponding one or more projections of the attachment interface 312.

The pivot pin interface 213 can be held in place by way of the interconnection between the notches of the pivot pin interface 213 and the projections of the attachment interface 312. Moreover, the arm 214 can be fixedly coupled to the attachment interface 312. For example, a bracket can be fixedly or removably coupled to the projections, over the arm 214 of the pivot pin interface 213, to prevent the pivot pin interface 213 from moving laterally outward from the rear pivot 311. The bracket can be fixed to the projections via bolts, rivets, or welding as non-limiting examples.

The bottom 35 of the dump body 30 can include the plurality of flat contact surfaces 301, such as shown in FIG. 7. The flat contact surfaces 301 may be in the form of a plate, such as a rectangular or square plate, though embodiments of the disclosed subject matter are not limited to the foregoing geometries. Optionally, the flat contact surfaces 301 can have a chamfered portion on a bottom edge thereof. The flat contact surfaces 301 can be provided generally at a middle portion of the dump body 30. In a top plan view of the dump body 30, the pair of flat contact surfaces 301 can be between the rear pivot support 310 and the pair of vertical support structures 370 in the length direction of the dump body 30. Additionally, the flat contact surfaces 301 can be provided on corresponding longitudinal support body members 377. For instance, the flat contact surfaces 301 can be provided on inward-facing surfaces of the longitudinal support body members 377. Thus, in embodiments of the disclosed subject matter, the flat contact surfaces 301 can be vertically-oriented, such as shown in FIG. 7. Moreover, the flat contact surface 301 on one longitudinal support body member 377 can be spaced apart from the flat contact surface 301 on the opposing longitudinal support body member 377 in the width direction of the dump body 30. The flat contact surfaces 301 can be coupled to the longitudinal support body members 377, for instance, by welding, rivets, or bolts, as non-limiting examples.

According to one or more embodiments, each flat contact surface 301 can be comprised of a first flat contact surface portion and a second flat contact surface portion spaced from the first flat contact surface portion in the length direction of the dump body 30, such as shown in FIG. 7. Optionally, the first and second flat contact surface portions of the flat contact surface 301 may be of the same configuration. Of course, each flat contact surface 301, according to one or more embodiments of the disclosed subject matter, may be represented by a single flat contact surface (e.g., a single plate). For example, only one of the first or second flat contact surface portions shown in FIG. 7 may constitute the flat contact surface 301.

Discussed in more detail below, when the dump body 30 is in a lowered position (i.e., rest position), the flat contact surfaces 301 attached to the dump body 30 can be positioned as shown in FIG. 7. That is, the flat contact surfaces 301 can be provided adjacent to outer or lateral sides of the outer elongate support members 201. According to one or more embodiments, the flat contact surfaces 301 can be parallel to the outer elongate support members 201.

The vertical support structures 370 of the dump body 30 can extend from a front face of front wall 37 of the dump body 30. The vertical support structures 370 can be fixed to the front face of the front wall 37, for instance, via welding. The vertical support structures 370 can be spaced apart from each other in the width direction of the dump body 30. According to one or more embodiments, the vertical support structures 370 can be centered on opposite sides of a vertical centerline of the dump body 30 in a front view of the machine 10, such as shown in FIG. 2. The vertical support structures 370 can be as set forth in U.S. application Ser. No. 16/663,825 filed Oct. 25, 2019 (Case 19-0770), which is incorporated herein by reference in its entirety.

Vertical support structures 370 can be vertical in at least the front view of the dump body 30. Depending upon the configuration of the front wall 37 of the dump body 30, in a side view of the dump body 30 the vertical support structures 370 may be generally vertical, for instance, at an angle 10 degrees or less from vertical.

According to one or more embodiments, the vertical support structures 370 can extend through a horizontal support structure 375, which can also be fixed (e.g., welded) to the front face of the front wall 37. Intersecting surfaces of the horizontal support structure 375 and each vertical support structure 370 can be fixedly attached via welding, for instance. The horizontal support structure 375 can be as set forth in U.S. application Ser. No. 16/663,825 filed Oct. 25, 2019 (Case 19-0770), which, as noted above, is incorporated herein by reference in its entirety.

Each vertical support structure 370 can have a down-facing contact surface 371. According to one or more embodiments, the down-facing contact surface 371 can be convex, for instance, semi-cylindrical, elliptical, or multi-planar. The down-facing contact surfaces 371 can be configured to be received or seated in the upward-facing contact surfaces 275 of the support rockers 274. Unlike the support rockers 274, the vertical support structures 370, themselves, do not pivot.

INDUSTRIAL APPLICABILITY

As noted above, embodiments of the present disclosure relate to space frame front lower frame connections, and systems, components, and methods thereof.

Embodiments of the disclosed subject matter can provide a lightweight, durable machine configuration with a reliable support definition of load points between the dump body 30 and the space frame 20, for instance, in light of dimensional variations due to tolerances and/or component deflection.

In terms of components of the space frame 20, the space frame 20 can include a pair of the front lower frame connections 260, each of which having the center boss 2602, the outer rearward horizontal front lower frame tube connection boss 2604, the inner rearward horizontal front lower frame tube connection boss 2606, the rearward angular front lower frame tube connection boss 2608, the vertical front lower frame tube connection boss 2610, the forward angular front lower frame tube connection boss 2612, the outer forward horizontal front lower frame tube connection boss 2614, the inner forward horizontal front lower frame tube connection boss 2616, the rearward horizontal beam 2620, and the forward horizontal beam 2630.

Notably, the rearward angular front lower frame tube connection boss 2608, the vertical front lower frame tube connection boss 2610, and the forward angular front lower frame tube connection boss 2612 can be castably attached to the center boss 2602. Thus, respective casting interfaces CI can be between the center boss 2602 and each of the rearward angular front lower frame tube connection boss 2608, the vertical front lower frame tube connection boss 2610, and the forward angular front lower frame tube connection boss 2612. Each of the foregoing tube connection bosses can taper from thick to thin toward respective casting interfaces CI with the center boss 2602. Such tapering from thick to thin can drive stress concentrations to the center boss 2602 from the extremities of the front lower frame connections 260.

Optionally, the web 2640, which can be beneficial for manufacturing, may be provided between the rearward horizontal beam 2620 and the rearward angular front lower frame tube connection boss 2608, the rearward angular front lower frame tube connection boss 2608 and the vertical front lower frame tube connection boss 2610, and/or the forward angular front lower frame tube connection boss 2612 and the forward horizontal beam 2630.

The rearward horizontal beam 2620 may be between the center boss 2602 and each of the outer rearward horizontal front lower frame tube connection boss 2604 and the inner rearward horizontal front lower frame tube connection boss 2606 and/or the forward horizontal beam 2630 may be between the center boss 2602 and each of the outer forward horizontal front lower frame tube connection boss 2614 and the inner forward horizontal front lower frame tube connection boss 2616.

The rearward horizontal beam 2620 may have the outer rearward horizontal beam member 2624 and the inner rearward horizontal beam member 2626. According to one or more embodiments, the outer rearward horizontal beam member 2624 can connect the outer rearward horizontal front lower frame tube connection boss 2604 to the center boss 2602 and/or the inner rearward horizontal beam member 2626 can connect the inner rearward horizontal front lower frame tube connection boss 2606 to the center boss 2602. Optionally, the outer rearward horizontal beam member 2624 and the inner rearward horizontal beam member 2626 can be integrally joined (i.e., formed in once piece) at the center boss 2602.

Respective casting interfaces CI can be between the outer rearward horizontal beam member 2624 and the outer rearward horizontal front lower frame tube connection boss 2604 and the inner rearward horizontal beam member 2626 and the inner rearward horizontal front lower frame tube connection boss 2606. Each of the foregoing tube connection bosses can taper from thick to thin toward respective casting interfaces CI respectively with the outer rearward horizontal beam member 2624 and the inner rearward horizontal beam member 2626. Such tapering from thick to thin can drive stress concentrations to the rearward horizontal beam 2620.

The forward horizontal beam 2630 may have the outer forward horizontal beam member 2634 and the inner forward horizontal beam member 2636. According to one or more embodiments, the outer forward horizontal beam member 2634 can connect the outer forward horizontal front lower frame tube connection boss 2614 to the center boss 2602 and/or the inner forward horizontal beam member 2636 can connect the inner forward horizontal front lower frame tube connection boss 2616 to the center boss 2602. Optionally, the outer forward horizontal beam member 2634 and the inner forward horizontal beam member 2636 can be integrally joined (i.e., formed in once piece) at the center boss 2602.

Respective casting interfaces CI can be between the outer forward horizontal beam member 2634 and the outer forward horizontal front lower frame tube connection boss 2614 and the inner forward horizontal beam member 2636 and the inner forward horizontal front lower frame tube connection boss 2616. Each of the foregoing tube connection bosses can taper from thick to thin toward the respective casting interfaces CI. Such tapering from thick to thin can drive stress concentrations to the forward horizontal beam 2630.

In a side view of the front lower frame connection 260, acute angles may be formed between each of the rearward horizontal beam 2620 and the rearward angular front lower frame tube connection boss 2608, the rearward angular front lower frame tube connection boss 2608 and the vertical front lower frame tube connection boss 2610, the vertical front lower frame tube connection boss 2610 and the forward angular front lower frame tube connection boss 2612, and/or the forward angular front lower frame tube connection boss 2612 and the forward horizontal beam 2630. Some or all of the angles may be different. Optionally, respective longitudinal axes of the tube connection bosses may intersect at a predetermined point on the center boss 2602. Such predetermined point may be the center of mass of the center boss 2602.

As shown in FIG. 6, for instance, the outer rearward horizontal beam member 2624 and the inner rearward horizontal beam member 2626 can be oriented at an acute angle relative to each other. Thus, the outer rearward horizontal front lower frame tube connection boss 2604 and the inner rearward horizontal front lower frame tube connection boss 2606 can also be oriented with respect to each other at the acute angle. FIG. 6 also shows that the outer forward horizontal beam member 2634 and the inner forward horizontal beam member 2636 can be oriented at an acute angle relative to each other. Thus, the outer forward horizontal front lower frame tube connection boss 2614 and the inner forward horizontal front lower frame tube connection boss 2616 can also be oriented with respect to each other at the acute angle. The acute angle can be the same as the acute angle between the outer rearward horizontal beam member 2624 and the inner rearward horizontal beam member 2626.

Each of the tube connection bosses can be adapted to be fixedly attached (e.g., welded) to respective elongate support member of the space frame 20. For example, as shown in FIGS. 4-6, the outer and inner rearward horizontal front lower frame tube connection bosses 2604, 2606 can be fixedly attached to elongate support members 203; the rearward angular front lower frame tube connection boss 2608 can be fixedly attached to elongate support member 202; the vertical front lower frame tube connection boss 2610 can be fixedly attached to elongate support member 208; the forward angular front lower frame tube connection boss 2612 can be fixedly attached to elongate support member 209; and the outer and inner forward horizontal front lower frame tube connection bosses 2614, 2616 can be fixedly attached to elongate support members 204. The acute angles between the bosses can be set based on a minimum angle needed for a welding device (e.g., an orbital welder) to weld respective elongate support members to the outer forward horizontal front lower frame tube connection boss 2614, the inner forward horizontal front lower frame tube connection boss 2616, the outer rearward horizontal front lower frame tube connection boss 2604, the inner rearward horizontal front lower frame tube connection boss 2606, the outer and inner rearward horizontal front lower frame tube connection bosses 2604, 2606, and the outer and inner forward horizontal front lower frame tube connection bosses 2614, 2616.

According to embodiments of the disclosed subject matter, the dump body 30 can operatively contact the space frame 20 according to a predetermined contact arrangement. For example, embodiments of the disclosed subject matter can provide for a six-point contact arrangement between the dump body 30 and the space frame 20. According to embodiments of the disclosed subject matter, such contact arrangement can be provided when the dump body 30 is in a rest position. Rest position as used herein can mean that the dump body 30 is in a lower-most or fully down position and not raised by the lift cylinders 125, which may be coupled to the center lower frame connections 220.

Referring to FIG. 7, which shows an exploded view of the space frame 20 and the dump body 30 of the machine 10, a first pair of contact points can be provided by the rear supports 211 of the space frame 20 and the rear pivots 311 of the rear pivot supports 310 of the dump body 30. Each rear support 211 can be pivotally connected to the dump body 30 via the rear pivot 311. Such connection can allow the front portion 36 of the dump body 30 to be raised and lowered between upper-most and lower-most positions via rotation about the common pivot axis created by the connection between the rear supports 211 and the rear pivots 311.

A second pair of contact points can be provided by the positioning of the flat contact surfaces 301 relative to the elongate support members 201. In particular, the flat contact surfaces 301, which notably can be on or part of the dump body 30 and not the space frame 20, can be provided adjacent to outer or lateral sides of the elongate support members 201, such as shown in FIG. 7. As noted above, the flat contact surfaces 301 may be positioned parallel to the elongate support members 201. Additionally, according to one or more embodiments of the disclosed subject matter, the flat contact surfaces 301 can contact the elongate support members 201. Such positioning of the flat contact surfaces 301 can be when the dump body 30 is in the lower-most or rest position. Moreover, such positioning of the flat contact surfaces 301 can accommodate for lateral or horizontal forces from the corresponding the elongate support members 201 of the space frame 20. Additionally, as noted above, the flat contact surfaces 301 may have a chamfered portion on a bottom edge thereof. Such chamfered portion can aid in the centering of the dump body 30 when the dump body 30 is transitioned to the rest or fully down position.

A third pair of contact points can be provided by the positioning of the vertical support structures 370, particularly the down-facing contact surfaces 371 thereof, removably on the support rockers 274, particularly the upward-facing contact surfaces 275 thereof. According to embodiments of the disclosed subject matter, the down-facing contact surface 371 can be removably seated on the upward-facing contact surface 275. Additionally, in a front view of the machine 10 a vertical centerline axis of the down-facing contact surface 371 of each of the vertical support structures 370 can be offset from the axis of rotation (i.e., pivot axis) of a corresponding one of the support rockers 274. For example, as shown in FIG. 2, the vertical centerline axis of the down-facing contact surface 371 can be offset inward in a width direction of the machine 10 relative to the axis of rotation for the support rocker 274.

The vertical support structures 370, particularly the down-facing contact surfaces 371 when contacting the upward-facing contact surfaces 275 of the support rockers 274, can transfer loading through the space frame 20 to the front suspension system and the front wheels 14. Moreover, the vertical support structures 370 can provide support for horizontal components of force vectors with respect to the dump body 30 load being transferred through the space frame 20 and the front suspension system to the front wheels 14. Additionally, because the support rockers 274 can pivot laterally and independently of each other, and because both the support rockers 274 and the vertical support structures 370 have cooperating contact surfaces (i.e., upward-facing contact surfaces 275 and down-facing contact surfaces 371, respectively), proper seating between the vertical support structures 370 and the support rockers 274 can be maintained, particularly when the dump body 30 is in the at-rest position, even when the machine 10 is moving, for instance. Such arrangement, as diagrammatically shown in FIG. 2, can thus provide an even load distribution LD with respect to each side of the support arrangement (i.e., side to side or laterally).

Also shown in FIG. 2, the support rocker 274/vertical support structure 370 combinations can be located along longitudinal axes of respective front struts 121 connected to respective front suspension members 120 on same sides of the space frame 20. For example, the pivot axis of the support rocker 274 may be aligned with a longitudinal axis a corresponding front strut 121. The longitudinal axes can intersect at a point $CL_1$ at a vertical centerline at a top of the dump body 30. Of course, embodiments of the disclosed subject matter are not so limited, and the longitudinal axis of the front strut 121 may not be aligned with the support rocker 274/vertical support structure 370 combination, such as the pivot axis of the support rocker 274. Also shown in FIG. 2, longitudinal axes of additional suspension members on opposite sides of the space frame 20 can intersect at a point $CL_2$ at the same vertical centerline of the machine 10 as point $CL_1$. The arrangement of the third pair of contact points, therefore, can uniformly transfer load from the dump body 30 through the support rockers 274 and the space frame 20 to the front suspension system.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A front lower frame connection casting for a space frame of a haul truck comprising:
   a solid center boss;
   an outer rearward horizontal front lower frame tube connection boss;
   an inner rearward horizontal front lower frame tube connection boss;
   a rearward angular front lower frame tube connection boss;
   a vertical front lower frame tube connection boss;
   a forward angular front lower frame tube connection boss;
   an outer forward horizontal front lower frame tube connection boss;
   an inner forward horizontal front lower frame tube connection boss;
   a rearward horizontal beam having:
      an outer rearward horizontal beam member connecting the outer rearward horizontal front lower frame tube connection boss to the solid center boss, and
      an inner rearward horizontal beam member connecting the inner rearward horizontal front lower frame tube connection boss to the solid center boss, wherein the outer rearward horizontal beam member and the inner rearward horizontal beam member are integrally joined at the solid center boss and are orientated at a first acute angle with respect to each other; and
   a forward horizontal beam having:
      an outer forward horizontal beam member connecting the outer forward horizontal front lower frame tube connection boss to the solid center boss, and
      an inner forward horizontal beam member connecting the inner forward horizontal front lower frame tube connection boss to the solid center boss, wherein the outer forward horizontal beam member and the inner forward horizontal beam member are integrally joined at the solid center boss and are orientated at a second acute angle with respect to each other.

2. The front lower frame connection casting according to claim 1, wherein the first and second acute angles are the same.

3. The front lower frame connection casting according to claim 1, wherein each of the tube connection bosses tapers from thick to thin toward respective casting interfaces.

4. The front lower frame connection casting according to claim 1,
wherein respective casting interfaces are provided between the solid center boss and each of the rearward angular front lower frame tube connection boss, the vertical front lower frame tube connection boss, and the forward angular front lower frame tube connection boss,
wherein respective casting interfaces are provided between the outer rearward horizontal front lower frame tube connection boss and the outer rearward horizontal beam member and between the inner rearward horizontal front lower frame tube connection boss and the inner rearward horizontal beam member, and
wherein respective casting interfaces are provided between the outer forward horizontal front lower frame tube connection boss and the outer forward horizontal beam member and between the inner forward horizontal front lower frame tube connection boss and the inner forward horizontal beam member.

5. The front lower frame connection casting according to claim 1, wherein in a side view of the front lower frame connection casting:
the rearward horizontal beam extends rearward in a first direction, the first direction being horizontal,
the forward horizontal beam extends forward in a second direction opposite the first direction, the second direction being horizontal,
the rearward angular front lower frame tube connection boss extends rearward and upward in a third direction,
the vertical front lower frame tube connection boss extends upward in a fourth direction, and
the forward angular front lower frame tube connection boss extends forward and upward in a fifth direction.

6. The front lower frame connection casting according to claim 1, wherein the front lower frame connection casting is flat on a bottom surface thereof from the rearward horizontal beam to the forward horizontal beam inclusive of the rearward and forward horizontal beams.

7. The front lower frame connection casting according to claim 1, wherein a web is provided between each of the rearward horizontal beam and the rearward angular front lower frame tube connection boss, the rearward angular front lower frame tube connection boss and the vertical front lower frame tube connection boss, and the forward angular front lower frame tube connection boss and the forward horizontal beam.

8. The front lower frame connection casting according to claim 1, wherein the vertical front lower frame tube connection boss and the forward angular front lower frame tube connection boss are provided at a first height, the rearward angular front lower frame tube connection boss is provided at a second height below the first height, and the outer and inner rearward horizontal front lower frame tube connection bosses and the outer and inner forward horizontal front lower frame tube connection bosses are at a third height below the second height.

9. The front lower frame connection casting according to claim 1, wherein each of the tube connection bosses is adapted to be weldably attached to respective frame tubes of the space frame.

10. A space frame for an off-highway rear haul truck comprising:
a first front lower frame connection casting; and
a second front lower frame connection casting spaced from the first front lower frame connection casting in a width direction of the space frame,
wherein each of the first and second front lower frame connection castings include:
a center boss,
an outer rearward horizontal front lower frame tube connection boss extending rearward from the center boss,
an inner rearward horizontal front lower frame tube connection boss extending rearward from the center boss,
a rearward angular front lower frame tube connection boss extending rearward and upward from the center boss,
a vertical front lower frame tube connection boss extending upward from the center boss,
a forward angular front lower frame tube connection boss extending forward and upward from the center boss,
an outer forward horizontal front lower frame tube connection boss extending forward from the center boss,
an inner forward horizontal front lower frame tube connection boss extending forward from the center boss,
a rearward horizontal beam having:
an outer rearward horizontal beam member between the rearward horizontal front lower frame tube connection boss and the center boss, and
an inner rearward horizontal beam member between the inner rearward horizontal front lower frame tube connection boss and the center boss, wherein the outer rearward horizontal beam member and the inner rearward horizontal beam member are orientated at a first acute angle with respect to each other, and
a forward horizontal beam having:
an outer forward horizontal beam member between the outer forward horizontal front lower frame tube connection boss and the center boss, and
an inner forward horizontal beam member between the inner forward horizontal front lower frame tube connection boss and the center boss, wherein the outer forward horizontal beam member and the inner forward horizontal beam member are at a second acute angle with respect to each other.

11. The space frame according to claim 10,
wherein respective casting interfaces are provided between the center boss and each of the rearward angular front lower frame tube connection boss, the vertical front lower frame tube connection boss, and the forward angular front lower frame tube connection boss,
wherein respective casting interfaces are provided between the outer rearward horizontal front lower frame tube connection boss and the outer rearward horizontal beam member and between the inner rearward horizontal front lower frame tube connection boss and the inner rearward horizontal beam member, and wherein respective casting interfaces are provided between the outer forward horizontal front lower frame tube connection boss and the outer forward horizontal beam member and between the inner forward horizontal front lower frame tube connection boss and the inner forward horizontal beam member.

12. The space frame according to claim 10, wherein in a side view of the space frame, for each of the first and second front lower frame connection castings:
the rearward horizontal beam extends rearward in a first direction,
the forward horizontal beam extends forward in a second direction opposite the first direction,
the rearward angular front lower frame tube connection boss extends rearward and upward in a third direction,
the vertical front lower frame tube connection boss extends upward in a fourth direction, and
the forward angular front lower frame tube connection boss extends forward and upward in a fifth direction.

13. The space frame according to claim 10, wherein each of the first and second front lower frame connection castings is flat on a bottom surface thereof from the rearward horizontal beam to the forward horizontal beam inclusive of the rearward and forward horizontal beams.

14. The space frame according to claim 10, further comprising a plurality of frame tubes, respective ones of the frame tubes being weldably coupled to the tube connection bosses of each of the first and second front lower frame connection castings.

15. A method regarding a front lower frame connection comprising:
providing a center boss of the front lower frame connection;
providing an outer rearward horizontal front lower frame tube connection boss of the front lower frame connection;
providing an inner rearward horizontal front lower frame tube connection boss of the front lower frame connection;
providing a rearward angular front lower frame tube connection boss of the front lower frame connection;
providing a vertical front lower frame tube connection boss of the front lower frame connection;
providing a forward angular front lower frame tube connection boss of the front lower frame connection;
providing an outer forward horizontal front lower frame tube connection boss of the front lower frame connection;
providing an inner forward horizontal front lower frame tube connection boss of the front lower frame connection;
providing a rearward horizontal beam of the front lower frame connection having:
an outer rearward horizontal beam member connecting the outer rearward horizontal front lower frame tube connection boss to the center boss, and
an inner rearward horizontal beam member connecting the inner rearward horizontal front lower frame tube connection boss to the center boss, wherein the outer rearward horizontal beam member and the inner rearward horizontal beam member are integrally joined at the solid center boss and are orientated at a first acute angle with respect to each other; and providing a forward horizontal beam of the front lower frame connection having:
an outer forward horizontal beam member connecting the outer forward horizontal front lower frame tube connection boss to the center boss, and
an inner forward horizontal beam member connecting the inner forward horizontal front lower frame tube connection boss to the center boss, wherein the outer forward horizontal beam member and the inner forward horizontal beam member are integrally joined at the solid center boss and are orientated at a second acute angle with respect to each other.

16. The method according to claim 15, further comprising:
castably attaching to the center boss the rearward angular front lower frame tube connection boss, the vertical front lower frame tube connection boss, and the forward angular front lower frame tube connection boss;
castably attaching to the rearward horizontal beam the outer rearward horizontal front lower frame tube connection boss and the inner rearward horizontal front lower frame tube connection boss; and
castably attaching to the forward horizontal beam the outer forward horizontal front lower frame tube connection boss and the inner forward horizontal front lower frame tube connection boss.

17. The method according to claim 16,
wherein respective casting interfaces are provided between the center boss and each of the rearward angular front lower frame tube connection boss, the vertical front lower frame tube connection boss, and the forward angular front lower frame tube connection boss,
wherein respective casting interfaces are provided between the outer rearward horizontal front lower frame tube connection boss and the outer rearward horizontal beam member and between the inner rearward horizontal front lower frame tube connection boss and the inner rearward horizontal beam member, and
wherein respective casting interfaces are provided between the outer forward horizontal front lower frame tube connection boss and the outer forward horizontal beam member and between the inner forward horizontal front lower frame tube connection boss and the inner forward horizontal beam member.

18. The method according to claim 15, further comprising weldably attaching respective elongate support members to each of the tube connection bosses.

19. The method according to claim 15, wherein respective longitudinal axes of the tube connection bosses intersect at a predetermined point on the center boss.

20. The method according to claim 15, wherein each of the tube connection bosses tapers from thick to thin toward respective casting interfaces.

* * * * *